Aug. 17, 1954
W. W. RIGROD
2,686,900
IONIC SWITCHING TUBE
Filed Aug. 29, 1951
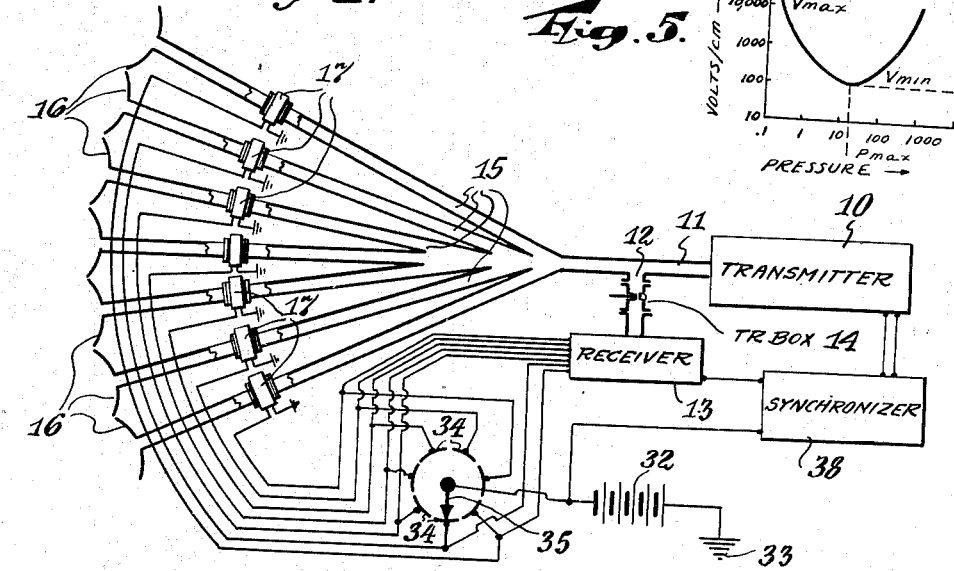
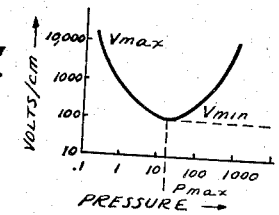
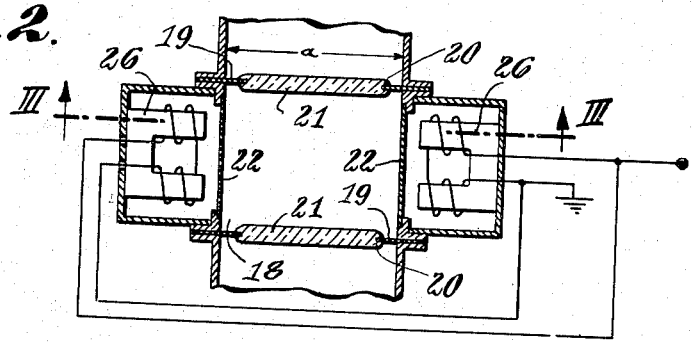
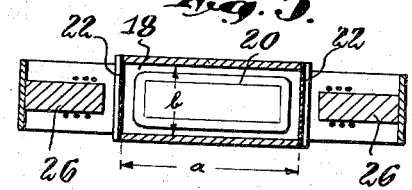
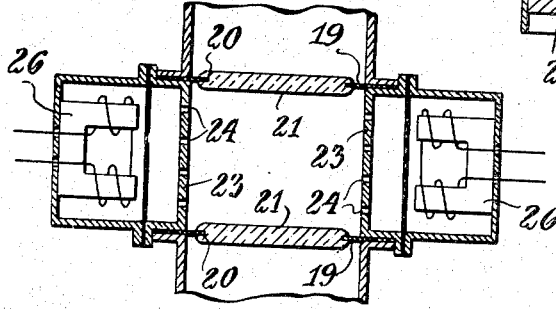
INVENTOR
W. W. RIGROD.
BY
ATTORNEY Patented Aug. 17, 1954

2,686,900

UNITED STATES PATENT OFFICE 2,686,900

IONIC SWITCHING TUBE

William W. Rigrod, Bloomfield, N. J., assignor to Westinghouse Electric Corporation, East Pittsburgh, Pa., a corporation of Pennsylvania Application August 29, 1951, Serial No. 244,229

5 Claims. (Cl. 333—13)

In the electronic art, there are occasions where it is desirable or necessary to pass a limited number of ultra high frequency wave pulses intermittently with complete interruption of passage of any pulses whatever. An instance of this character is in connection with radar scanning with fixed instead of rotating antennas. In such a system the beam is sequentially emitted from successive antennas necessitating that only one at a time shall transmit and all others not transmitting or receiving.

The switch of the present invention can accordingly be situated one in series with each antenna to pass the wave energy at the moment its antenna is to operate and to prevent passage of wave energy during the periods in which each of the other antennas sequentially operate. While the switch has other uses, it is not deemed necessary to elaborate thereon, it being sufficient to indicate the one use as evidence of the utility of my invention.

For the information of the less informed, it may be here explained that the use of reflection of radio waves for various purposes as determination of altitude of an airplane to ground, for locating one plane from another or from a fixed station, and for other purposes, is an accomplished fact, and is known under the general designation of radar. In such systems, the wave is generated, passed to the antenna and into space, reflects from the object addressed, returns to the antenna, and thence to the receiver. Some systems rotate the antenna and its rotational position at the moment of receipt of a reflected signal determines the direction where the object is located. The present system, however, utilizes a plurality of antennas having fixed relationship pointing in different directions, and direction of the object from which the signal reflects is determined by appropriate indication of which antenna issued and received the micro-wave pulse reflected back to the receiver. Consequently, only one antenna should function at a time.

Basically, the invention proposes a switch having a direct and positive control of wave energy in a waveguide to fully pass or fully interrupt the wave energy as desired.

A further primary object of the invention is to vary the breakdown level of the ionizable medium of a switching tube synchronously with a pulsed signal.

An objective closely related to the foregoing one is to lower the break-down voltage level of the medium during the pulse interval when break-down is required.

In general terms, an object of the invention is to obtain a break-down short circuit path effective over a wider range of applied radio frequency voltage in the line protected by the switching tube.

A more specific object of the invention is to vary the break-down level of the switch by varying the pressure of the ionizable medium employed.

Other objects of the invention will appear to persons skilled in the art to which it appertains as the description proceeds, both by direct recitation thereof and by inference from the context.

Referring to the accompanying drawing, in which like numerals of reference indicate similar parts throughout the several views:

Fig. 1 is a somewhat diagrammatic view of a radar system wherein each of a plurality of waveguides to fixed antennas includes a switch of the present invention;

Fig. 2 is a longitudinal section of one of the switches in its generic embodiment;

Fig. 3 is a cross-section on line III—III of Fig. 2;

Fig. 4 is a view similar to Fig. 2 for illustrating the invention as applicable to fixed-dimension cavity resonators; and Fig. 5 is a typical break-down curve showing ionization of helium, with mercury added, under varying conditions of pressure and field strength.

In the specific embodiment of the invention and one use thereof illustrated in the drawing, a radar system is shown providing a transmitter 10 with an output waveguide 11 for the pulsed energy therefrom. Laterally from the waveguide 11 is a branch line 12 to a receiver 13 protected by a TR-box 14 in the branch line. Further from the transmitter than said branch line, the waveguide is split into a plurality of feeder lines 15 to a like plurality of antennas 16. In each of these feeder lines 15 is an electronic switch 17 of the present invention. It is to be understood that waveguide 11 and lines 12 and 15 above referred to are all rectangular waveguides, preferably having cross-sectional shape such that long dimension $a$ is greater than half of the length of the characteristic wave length, and short dimension $b$ is less than half of that typical wave length.

The switch, as shown particularly in Figs. 2 and 3, comprises a cavity resonator 18 likewise having transverse dimensions $a$ and $b$ and having end walls 19 each with an opening or iris 20 looking into the waveguide in opposite longitudinal directions. Said opening 20 is closed by a window 21 of glass or other suitable material through which wave energy may pass readily, but which will seal the resonator enabling said resonator to be evacuated and charged with an ionizable gas, of which argon, neon, krypton and the like are examples.

As hereinbefore indicated, the problem solved by the present invention is to obtain a switching tube such that the break-down voltage for ionization is small when the ionization is desired, but large when ionization is not desired. Theory and experiment have shown that, for a given cavity resonator geometry, the curve of the break down field strength, namely, volts per centimeter, versus gas pressure is in accord with the Paschen curve for D.-C. voltage breakdown, as shown in Fig. 5. It will be observed the field strength is very high at low pressures, decreases at the left of the curve with increasing pressure until it reaches a minimum and then increases gradually from that minimum as the pressure increases. According to the invention as herein specifically described, the pressures are employed for that part of the descending curve from high to minimum field strength, so that in the ionic switch, for variation of field strength from a very low value ($V_{min}$) to a very high value ($V_{max}$) at varying decreasing pressures within the relatively low range, an electrodeless gas discharge takes place, and with the pressure variation applied periodically and synchronized with the signal pulse of the radar system. Accomplishment of this desideratum is obtained by varying the gas pressure $p$ in the switch box, utilizing a low static gas pressure so that the electrical break-down of the gas is as above described represented at the left end of the curve of Fig. 5, in which voltages decrease to a minimum while the pressure is on the increase. Thus, in the structural showing, during the pulse period when the switch has to prevent passage of the high power outgoing signal, the pressure is increased so as to cause the gas to ionize at a lower field strength graphically on the left end dip of the curve between $V_{max}$ and $V_{min}$, to and including the lowest $V_{min}$ when the maximum pressure $P_{max}$ is applied.

On the other hand, when it is desired to transmit a high power outgoing pulse, the gas pressure is reduced from $P_{max}$ to a considerably smaller value at which the break down field strength rises, graphically at the left end of the curve of Fig. 5, toward or to $V_{max}$, preventing ionization and therefore not interrupting the outgoing pulse. In the typical utilization of the invention, only one of the several switches at a time is restrained from interrupting the outgoing signal whereas all of the others are caused to ionize and thereby interrupt all of those high power pulses. In this manner, the outgoing pulse radiates from only one antenna at any one instant.

The mechanism by which the varied pressure is introduced may be of sonic or supersonic nature of a character applying a high-intensity wave to the ionizable gas successively compressing and relaxing the gas. The pressure-time curve for ionization controlling wave may be sinusoidal or non-sinusoidal, but in any event, synchronized with the signal pulse.

An arbitrarily selected embodiment of the invention for illustrating one particular means of producing the wave pressure is depicted in Figs. 2 and 3 and comprises provision of two flexible diaphragms 22 parallel to each other, and, in these figures, at opposite sides of and constituting part of the side walls of the cavity resonator of the switch box. If desired, and as shown in Fig. 4, the diaphragms 22 may be outside of the cavity resonator but still a part of the side walls of the switch box. In this case, the cavity resonator has fixed side walls 23 with perforations 24 opposite the diaphragms. Flexing of the diaphragms will therefore not alter the volume of the cavity resonator, but still can vary the pressure in the entire box including the resonator. In both arrangements, said diaphragms are sealed at their entire peripheral margins to the wall margins bordering openings in said walls of substantially corresponding shape and size as the diaphragms, so the diaphragms completely close said openings with the inner faces of the diaphragms having direct contact with the ionizable gas in the box and with the outer faces of the diaphragms exposed to the atmosphere. Wave impulses applied, therefore, to the exterior faces of the diaphragms obtain a responsive flexing or vibration of the diaphragms which set up a corresponding sequential compression and relaxation of the gas within the switch box and resonator.

One means of applying wave impulses to diaphragms 22 is by means of electromagnets adjacent the diaphragms which constitute armatures for the magnets and will vibrate the diaphragms in the same manner as occurs in telephone receivers. Consistent with the aim of producing the greatest possible ratio of maximum to minimum gas pressures, two diaphragms 22 have been described as used and at opposite sides of the switch box, and electromagnets 26 are provided for both diaphragms. The magnets are wound and connected to have the poles thereof toward the diaphragms simultaneously of the same polarity. Thus, both diaphragms will be flexed outwardly simultaneously and inwardly simultaneously. Current for the electromagnets may be derived from a source 32 and successively applied to and interrupted from connections with the magnets by any desired synchronizer 38 controlled by the pulsing of the transmitter 10. Appropriate connection is, of course, made between the synchronizer and receiver to distinguish as to which antenna receives the reflected signal.

I claim:

1. An ionic switch tube comprising a gas-tight enclosure having a window for passage of an electromagnetic wave, said enclosure having a flexible wall portion and said enclosure having an ionizable gas therein pressure whereof may be varied by flexing said wall portion, and means external of and operatively associated with said flexible wall portion for flexing said wall portion and thereby vary the gas pressure within the enclosure.

2. An ionic switching tube comprising a gas-tight enclosure having opposed windows for passage of an electromagnetic wave through the enclosure, said enclosure having a flexible wall portion laterally located to the direction of propagation of said wave through the enclosure, said enclosure having an ionizable gas therein making contact with said flexible wall portion, and means external of and operatively associated with said flexible wall portion for flexing said wall portion and thereby vary the gas pressure within the enclosure.

3. An ionic switching tube comprising a gas-tight enclosure having a flexible magnetic-responsive wall portion, said enclosure having an ionizable gas therein, and an electromagnet exterior to said flexible wall portion and close thereto for applying magnetic flux of the magnet to flex said wall portion and thereby vary the pressure of said gas within the enclosure.

4. An ionic switching tube for use with a pulsed wave, comprising a gas-tight enclosure having a flexible magnetic-responsive diaphragm, said enclosure having an ionizable gas therein confined by said diaphragm, means for flexing said diaphragm and thereby varying the pressure of gas confined by said diaphragm, and a synchronizer for relating the flexing of said diaphragm to the wave pulses.

5. An ionic switching tube containing an ionizable gas, and means for effecting ionization of said gas at varying potentials comprising electromagnetic means for varying the pressure of said ionizable gas in said tube.

References Cited in the file of this patent

UNITED STATES PATENTS

| Number | Name | Date |
|---|---|---|
| 2,412,892 | Krasik | Dec. 17, 1946 |
| 2,576,100 | Brown | Nov. 27, 1951 |